United States Patent [19]

Petros et al.

[11] 3,733,108

[45] May 15, 1973

[54] THRUST MECHANISM FOR A MILL ROLL BEARING ASSEMBLY AND THE LIKE

[75] Inventors: Andrew J. Petros; James M. Minteer, both of Pittsburgh, Pa.

[73] Assignee: Mesta Machine Company, Pittsburgh, Pa.

[22] Filed: Mar. 31, 1971

[21] Appl. No.: 129,898

[52] U.S. Cl. ............................................. 308/236
[51] Int. Cl. ............................................. F16c 35/06
[58] Field of Search ................................. 308/236

[56] References Cited

UNITED STATES PATENTS

| 2,886,382 | 5/1959 | Baublys | 308/236 |
|---|---|---|---|
| 3,453,031 | 7/1969 | Rickley et al | 308/236 |

*Primary Examiner*—Charles J. Myhre
*Assistant Examiner*—Frank Susko
*Attorney*—Don J. Smith

[57] ABSTRACT

A thrust mechanism on a shaft structure comprises a member slidably mounted on the structure for movement longitudinally thereof, stop means positioned on the structure at the terminus of such movement, and first and second thrust members. The first thrust member is slidably mounted on the structure for movement longitudinally thereof into bearing contact with the slidable member. Means are provided for slidably mounting the first thrust member against turning movement thereof relative to the structure. Second stop means are provided on the shaft structure, together with means for mounting the second thrust member against the second stop means for turning movement thereof relative to the shaft structure. Means are provided for securing the second thrust member to the structure against further turning movement thereof following a predetermined limited angular displacement of the second thrust member, together with means on at least one of the thrust members and engageable with the other of the thrust members for urging the first thrust member and the slidable member against the first stop means and for urging the second thrust member against the second stop means.

16 Claims, 9 Drawing Figures

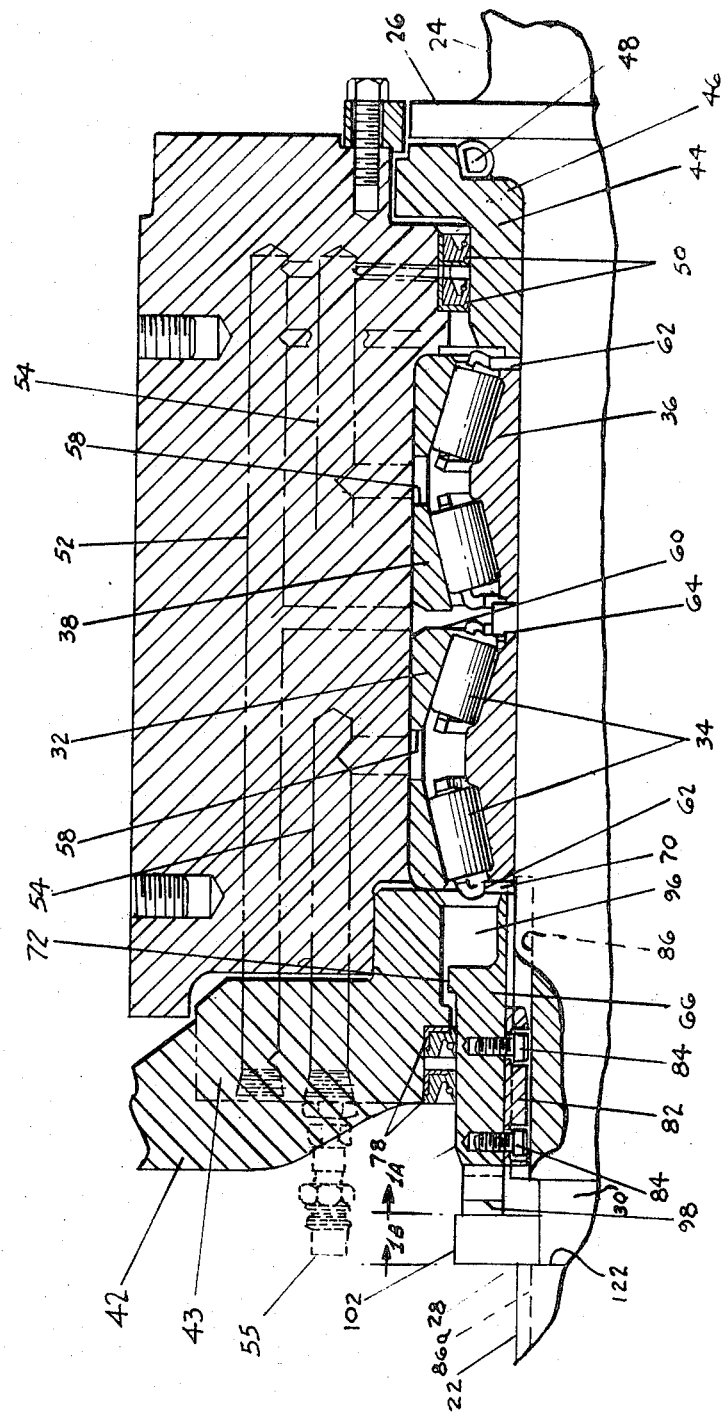

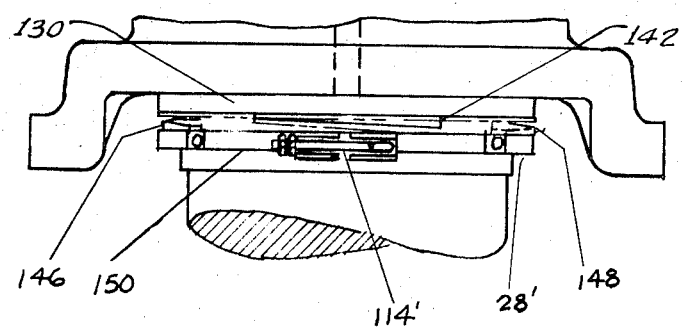
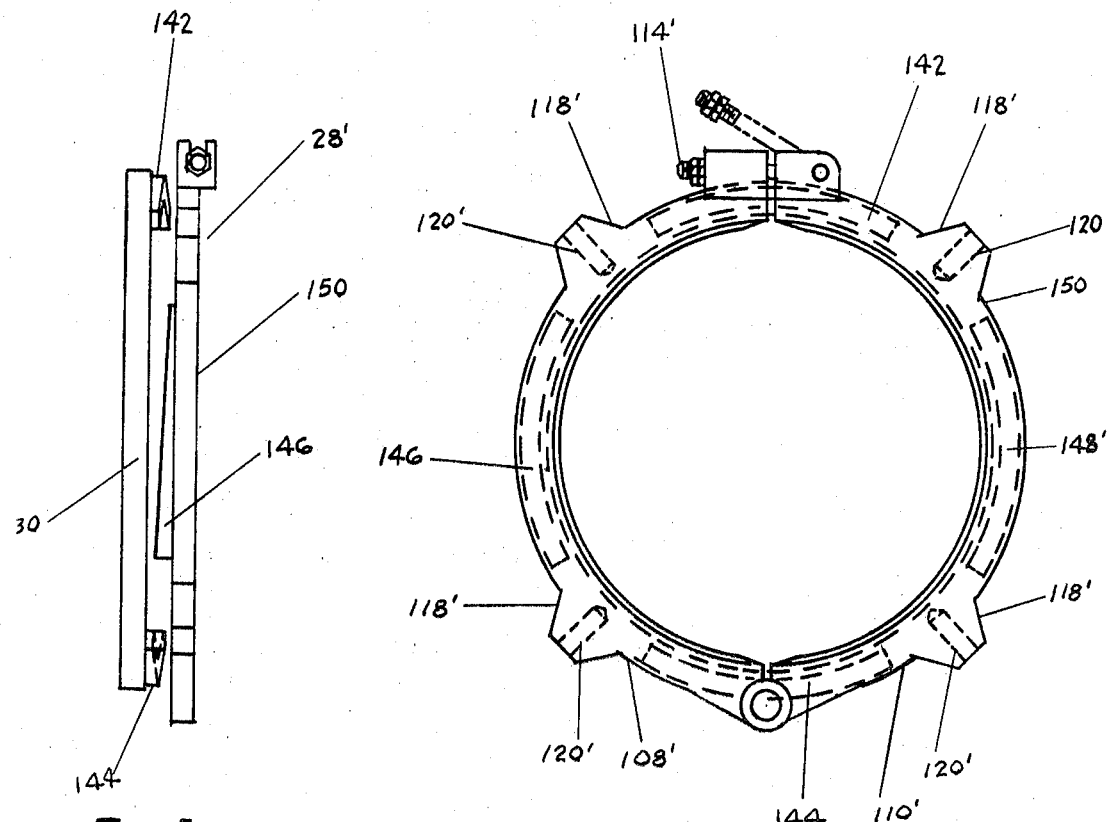

THRUST MECHANISM FOR A MILL ROLL BEARING ASSEMBLY AND THE LIKE

The present invention relates to a thrust mechanism for mill roll bearings and more particularly to a thrust clamp of the character described which can be quickly attached to and quickly removed from mill rolls and from work rolls in particular. The invention is directed especially to a significant reduction in the time required for changing the mill rolls.

During the operation of a rolling mill, the mill rolls are rotated rather rapidly in suitable arrangements, which are supported on the mill stand. The rolls are turned while in contact with elongated metal stop for processing feed stock into strip or other configuration. The work rolls of a typical mill may be rotated at a speed on the neighborhood of 500 rpm. Each of the bearing assemblies is housed in a bearing chock or roll box, which desirably includes all of the necessary components for the lubrication sealing, thrust take-up, and positioning of the bearing assembly. Each mill roll is machined to receive components of the bearing assemblies on its reduced end or roll necks. It is desirable to provide a quick and convenient manner of positioning, seating, and locking the bearing assemblies on the mill rolls, and particularly on the work rolls of the rolling mill, for the reasons set forth below.

In latter day rolling mills, particularly in cold mills, the terminal speed of the strip or other configuration being rolled may approach 6,000 feet per minute. In these mills, the rolling forces may exceed a million pounds. At typical speeds and rolling forces, the mill rolls, particularly the work rolls, are subject to unbelievable wearing forces. In many applications the useful life of the work rolls is limited to about 4 to 8 hours of normal usage before regrinding is required. Thus, on a three-shift basis, the work rolls may be changed as often as 180 times per month per mill stand.

Known procedures for changing work rolls have consumed inordinant amounts of time and labor in withdrawing the used rolls from each mill stand and replacing them with a new set of rolls. Roll-changing operations cause considerable down time of the rolling mill and attendant loss of production. The use of additional operating personnel, who are not otherwise necessary for the actual operation of the rolling mill, also are required.

A large proportion of the time involved in the roll-changing sequence, is occupied in de-chocking or stripping the roll bearing assemblies from the removed, worn out rolls and installing the bearing assemblies on replacement rolls, in the roll shop. As evident from the foregoing, mill roll de-chocking and re-chocking are oft-repeated operations during normal use of the rolling mill. If the time consumed by de-chocking and re-chocking of the mill rolls can be significantly reduced, a considerable saving of labor for the repetitive roll changes can be effected in the roll shop.

When assembling the roll bearings on the mill roll necks, it is necessary to provide convenient means for locating the bearing on the roll neck and for taking up any slack, followed by locking the bearing and bearing chock in place. To strip the bearing assemblies from the roll necks the assembly procedure is, of course, reversed. Each assembly and disassembly of the roll bearings, in conventional practices is a time-consuming operation involving considerable effort and labor. In the past a considerable maintenance effort has been required, together with a relatively larger number of spare rolls, in order to keep the rolling mill running with a minimum of delay.

Known mill roll bearing arrangements are typified by the U. S. Pats. to Workstein No. 2939750, Whittum No. 3502375, Boghosiam No. 3259442, and Rickley et al. No. 3453031. These disclosures involve half or split retaining rings and a threaded thrust ring or rings engaging the retaining ring and the adjacent end of the bearing races to position the roll bearings on the roll necks although well suited for their intended purposes. These prior positioning and thrust arrangements are for the most part incapable of applying sufficient forces over a very limited time interval to seat properly the roll bearings on the roll necks for the purpose of the present invention. In the Workstein arrangement for example installing the bearing assembly involves a number of time-consuming steps commencing with assembling the Workstein backing ring and the bearing races. The pressure ring is loosley located in position by the clamping block, and an external hydraulic jack or equivalent is assembled between the pressure ring and the thrust ring to seat the inner bearing races. The jack is then removed together with the thrust ring, followed by installation of a second thrust ring upon which is threaded the sleeve member. Then, the first thrush ring must be re-installed in the roll neck journal, and the threaded sleeve is rotated on the second thrust ring until the several components of the Workstein positioning and clamping arrangement are jammed tight. The sleeve member is then indexed forward or backward to permit engagement of its locking screw. Similarly protracted assembly and disassembly procedures are encountered in other known bearing assemblies of this type.

These difficulties of the prior art are overcome in accordance with the present invention which contemplates a considerably simplified bearing positioning and retaining structure including a thrust mechanism. The thrust mechanism and bearing arrangement of the invention can be assembled and disassembled within a very short time to save a significant amount of maintenance time and effort normally consumed in the roll shop. More particularly, my bearing thrust mechanism wedging means components which can be quickly manipulated to apply a considerable force longitudinally of the bearing assembly to drive the bearing assembly into its seated position against a roll neck flange or shoulder or other stop means. The thrust mechanism acts and reacts respectively against the adjacent end of the bearing assembly and against second stop means likewise located on the roll neck. No auxiliary force-applying means are required, save for a manipulative tool for the thrust mechanism. The claim mechanism also serves as quick-detach clamp means for retaining bearing assembly securely on the roll neck journal after seating of the assembly.

I accomplish these desirable results by providing a thrust mechanism on a shaft structure, said mechanism comprising a member slidably mounted on said structure for movement longitudinally thereof, stop means positioned on said structure at the terminus of said movement, first and second thrust members, said first thrust being slidably mounted on said structure for movement longitudinally thereof into bearing contact with said slidable member, means for slidably mounting said first thrust member against turning movement thereof relative to said structure, second stop means on said shaft structure, means for mounting said second thrust member against said second stop means for turning movement thereof relative to said shaft structure, means for securing said second thrust member to said structure against further turning movement thereof following a limited angular displacement of said second thrust member, and means on at least one of said thrust members and engageable with the other of the said thrust members for urging said first thrust member and said slidable member against said first stop means and for urging said second thrust member against said second stop means.

I also desirably provide a similar thrust mechanism wherein said urging means include a wedging arrangement secured to at least one of said thrust members and engageable with the other of said thrust members.

I also desirably provide a similar thrust mechanism wherein said second stop means include a journal formed in said shaft structure, and said second thrust member is of anular configuration and seated in said journal.

I also desirable provide a similar thrust mechanism wherein said second thrust member is formed from a pair of half rings pivoted at one pair of adjacent ends thereof, and clamp means are engageable with the other adjacent ends of said half rings for varyingly urging said other adjacent ends together to seat said second thrust member in said journal and to clamp said second thrust member to said shaft structure.

I also desirably provide a thrust mechanism and bearing arrangement on a rotatable shaft or the like, said bearing arrangement including an inner race fitted over said shaft and slideable therealong, first stop means on said shaft for delimiting sliding movement of said inner race, first and second annular thrust members fitted over said shaft and slideable therealong, second stop means on said shaft and engageable with an adjacent one of said thrust members on a side opposite from said inner race to delimit the slideable movement of said thrust members and said inner race in the opposite direction, the other of said thrust members being shaped for bearing engagement with said inner race, and means on said thrust members and on said shaft and operable upon turning movement of one of said thrust members for urging said one thrust member against said second stop means and for urging said other thrust member and said inner bearing race into bearing contact and against said first stop means.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is a partial, longitudinally sectioned view of one form of mill roll bearing assembly and thrust mechanism arranged in accordance with the invention;

FIG. 3 is a reduced and partial top plan view, partially sectioned, of the apparatus shown in FIG. 2 and taken generally along reference line III—III thereof;

FIG. 4 is an end elevational view of the thrust mechanism, with components of the bearing structure and mill roll having been removed, and taken generally along reference line IV—IV of FIG. 2.

FIG. 5 is a side elevational view of the thrust mechanism as shown in FIG. 4.

Figure 1A:
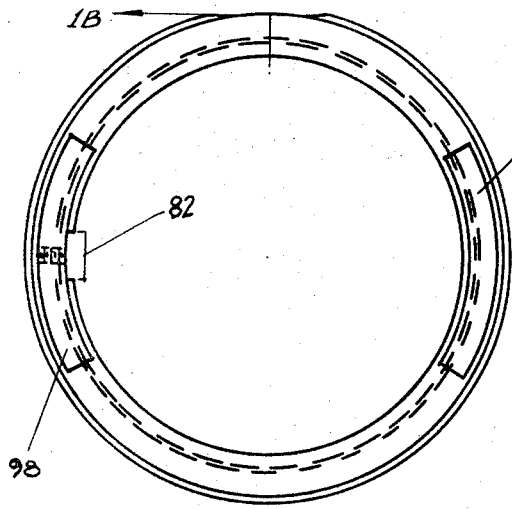
FIG. 1A is a reduced sectional view of the apparatus of FIG. 1 taken generally along reference line IA—IA thereof and showing a component of the thrust mechanism in elevation.
Figure 1B:
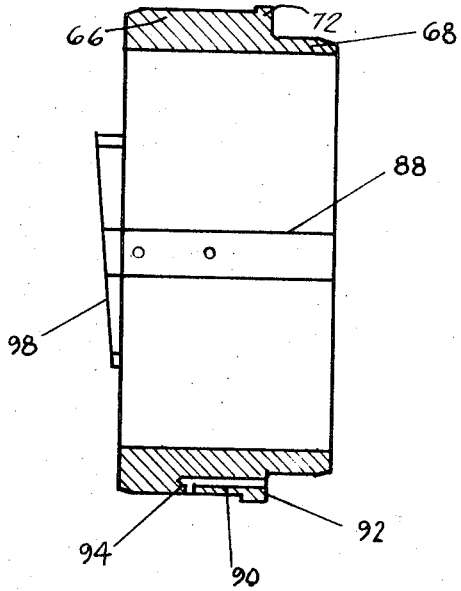
FIG. 1B is a cross-sectional view of the thrust ring shown in the preceeding figure and taken along reference line IB—IB thereof.
Figure 1C:
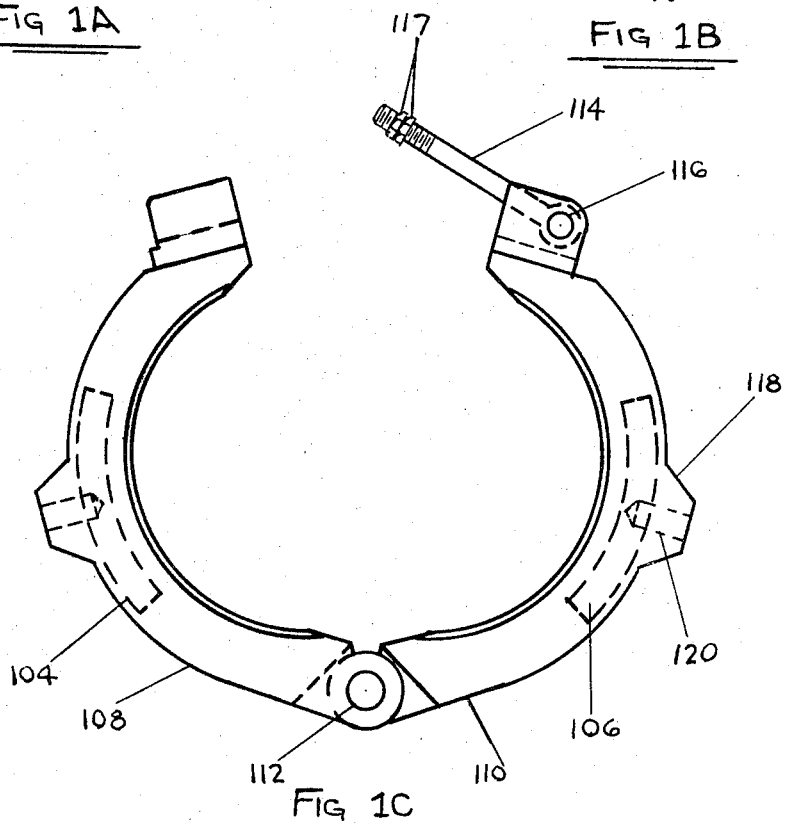
FIG. 1C is a reduced sectional view taken along line IC—IC of FIG. 1 and showing another component of the thrust mechanism substantially in elevation.
Figure 1D:
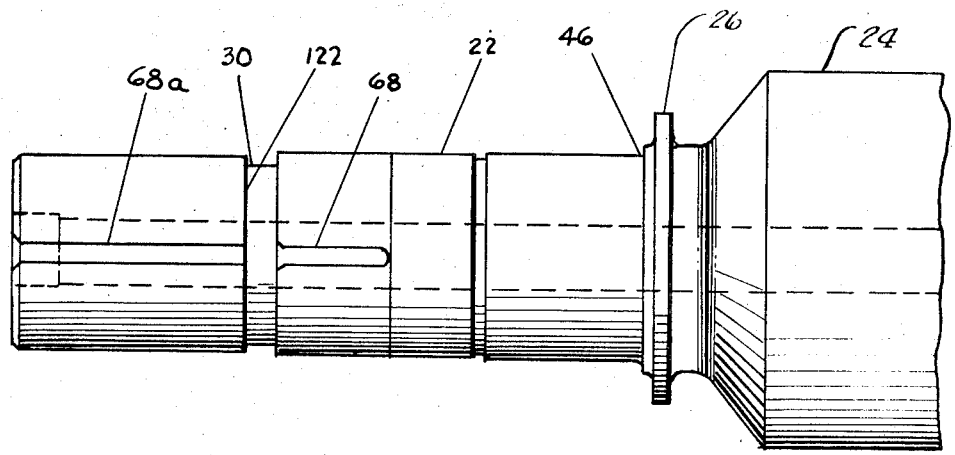
FIG. 1D is a partial reduced top plan view a mill work roll adapted for use with the invention.

Referring now to FIGS. 1 through 1D, the exemplary mill roll bearing arrangement 20 shown therein in configured for quick-assembly and quick-disassembly relative to a shaft-structure such as roll neck 22 of an appropriate mill roll, in this case work roll 24. The roll neck 22 is delineated adjacent the roll 24 by means such as a flinger or flange 26 against shoulder 46 of which the bearing arrangement 20 must be properly seated. Adjacent the other end of the roll neck 22, bearing thrust mechanism 28 forms in the illustrated example, part of the bearing assembly 20 and components of the thrust mechanism are mounted as described hereafter in roll neck journal 30, which form a second stop means.

The bearing 32 proper of the bearing arrangement 20 is a four row, tapered variety of conventional construction. The four row bearing 32 thus includes a number of rollers 34 retained as shown between inner and outer bearing races 36, 38. The outer bearing race 38 is conventionally mounted in a more or less stationary bearing chock or box 40 where it is retained by an angular clamp plate 42. The angular clamp ring 42 is provided with an outward extension 43, which is engaged elsewhere (not shown) to the roll chock 40 in a conventional manner to retain the clamp ring 42 against the adjacent end of the other bearing race 38.

The inner bearing race 36 is securely mounted on the roll neck 22 for rotation therewith. When properly installed, the inner bearing race is seated properly on the roll neck 22. The inner bearing race 36 is properly located with respect to the roll neck 22 by tightly engaging a spacer ring 44 which in turn is tightly seated against shoulder 46 of the roll neck flange 26. Water and other foreign material are prevented from entering the bearing 32 along the surface of the roll neck 22 by means of O-ring 48 compressed between the spacing ring 44 and roll neck flange 26. Such foreign material is likewise prevented from entering the bearing 32 along the outer surfaces of the spacer ring 44 by a pair of conventional wiping seals 50 supported on the bearing chock 40 engagement with the spacer ring 44, which, of course, rotates with the roll neck 22. The bearing chock 40 further includes vent and lubricant passages denoted respectively by reference characters 52, 54, which communicate with similar passages in the inner and outer bearing races.

As noted previously the inner bearing race 36 is forcefully positioned between the aforedescribed spacing ring 44 and a thrust member or ring 66 forming part of the thrust mechanism 28. Thereafter, the thrust member 66 is backed off, as described below to provide a predetermined degree of looseness to the inner race. The inner race can then turn slightly relative to the roll neck 22 to prevent "hammering." The thrust ring 66 (described hereinafter in greater detail with respect to FIGS. 1A, 1B) includes a tubular extension 68, formed in this example integrally thereof, which forcefully engages the adjacent end 70 of the inner bearing race 36. The thrust ring 66 further includes an outward flange 72 which is spaced axially of an inward flange 74 of the claim ring 42 to prevent inadvertent displacement of the thrust ring 66. An outer cylindrical surface 76 of the thrust ring 66 is engaged by a pair of conventionally configured wiping seals 78 supported in the illustrated embodiment on the clamp ring 42.

A key or spline 82 is secured to the inner surface of the thrust ring 66, in this example by a pair of cap screws 84. The key 82 seats into longitudinal groove or keyway 86 in the adjacent surface of the roll neck 22 to prevent rotation of the thrust ring 66 relative to the roll neck 22 for the purposes described below. The groove 86 is continued on the other side of the roll neck journal 30 as denoted by reference character 86a to the outer end of the roll neck, as better shown in FIG. 1D when the mill roll 24 is illustrated without the bearing components and thrust mechanism. At the other end (not shown) of the mill roll 24 the keying groove 86 is axially aligned with one of the drive keyways of the mill roll which are conventionally used for engaging the other mill roll end to a drive spindle (not shown). The aligned grooves afford an avenue whereby the thrust ring 66 and key 82 can be quickly and easily fitted over the roll neck 22 to the position shown in FIG. 1. Although only one key 82 (FIG. 1A) is utilized in this arrangement of the invention it will be unerstood that additional keys 82 and longitudinal grooves 86 can be employed if required.

The key 82 is seated in a similar but in this example shallower groove extending longitudinally across the inner surface of the thrust ring 66 (FIG. 1B).

The thicker portion of the thrust ring 66 is provided with a bore 90 which opens onto shoulder 92 formed at the intersection of the tubular extension 68 with the main body of the thrust ring 66. A radial hole 94 connects the inner end portion of the bore 90 with the cylindrical surface 76 of the thrust ring 66. The bore 90 and radial passage 94 afford relief for excess lubricant trapped within annular space 96 of the bearing assembly 20 (FIG. 1). In furtherance of this purpose the radial passage 94 communicates with the space 96 between the aforementioned wiping seals 78.

The thrust ring 66 is further provided with a wedging means, in this case a pair of wedging members 98, 100. The member 98, 100 can be formed integrally with the thrust ring 66 as a pair of arcuate inclined surfaces rising from the surrounding thrust ring surfaces and extending toward the thrust clamp 102 described below. The wedge members 98, 100 are engageable with the thrust clamp to force the thrust ring 66 and the clamp 102 apart, and more particularly are engageable with similar and complementary wedging surfaces of the thrust clamp 102 for this purpose as described below.

The thrust clamp 102 as best shown in FIG. 1 is seated in journal 30 of the roll neck 22 and is provided with a pair of complementary wedging surfaces 104, 106 (FIG. 1C) which are respectively engageable with the wedging surfaces 98, 100 of the thrust ring 66. The wedge members 104, 106 are likewise arcuate and are substantially diametrically opposed on the adjacent side of the thrust clamp 102. The thrust clamp 102 in this example preferably is configured as pair of half rings 108, 110 which are pivoted at 112. The wedging surfaces 104, 106 are located on the thrust clamp halves 108, 110 so as to diametrically opposed as aforementioned when the thrust clamp 102 is closed about the journal 30. When thus positioned, the thrust clamp 102 can be preliminarily seated and then subsequently locked in the journal 30 by operation of the swing bolt 114 which is pivoted at 116 to an end portion of one of the thrust clamp half-rings, for example, the half-ring 110 as shown in FIG. 1C.

Each of the thrust clamp halves 108, 110 is provided with at least one or tool-engaging operating, extension 118 having therein an operating hole 120. A caliper-like instrument or other suitably configured manipulative tool (not shown) can be employed to engage the operating extensions by insertion into the holes 120 thereof for the purpose of angularly displacing the thrust clamp 102. The thrust clamp 102 is turned in such direction that the wedging surfaces 98, 100 and 104, 106 of the thrust mechanism 28 are complementarly engaged to separate the thrust clamp 102 and the thrust ring 66 to drive the inner bearing race 36 and spacer ring 44 against the neck flange 26. During turning of the thrust clamp 102 for this purpose the thrust clamp is prevented from axial movement along the roll neck 22 by its rigid engagement with the outward edge 122 of the roll neck journal 30.

With reference now to FIGS. 2–5 of the drawings another form 20' of my novel mill roll bearing assembly is illustrated. In the latter group of drawings, particularly FIG. 2, components similar to those of preceeding figures are designated by similar reference characters with primed accents. The mill roll bearing races 36', 38', are similarly secured on the mill roll neck 22' and on the bearing chock 40' as set forth in connection with FIG. 1. The annular clamp ring 42' however has the wiping seals 78' mounted on its tubular extension 124 for wiping engagement respectively with the inner bearing race 36' and with a composite thrust ring denoted generally by reference character 126. As in the case of FIG. 1, the the annular clamping ring 42' engages and positions the outer bearing race 38' by means of the tubular extension 124 of the clamping plate 42'.

Figure 2:
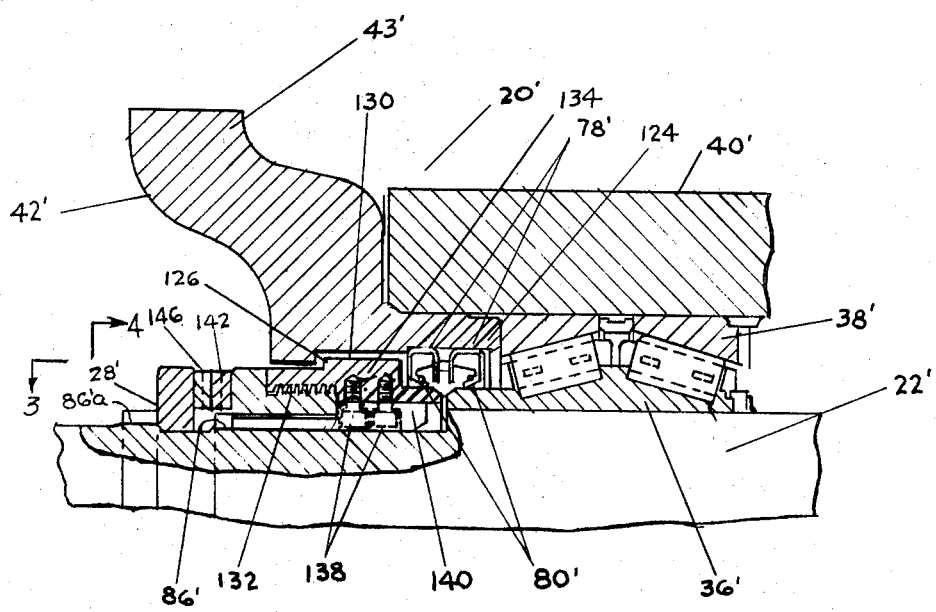
FIG. 2 is a partial longitudinally sectioned view of another bearing arrangement according to the invention and incorporating a modified thrust mechanism.

In the modification of the invention as shown in FIG. 2, the thrust mechanism 28' is configured for ready adaptability to certain types of existing roll bearing arrangements 20'. The thrust ring 130 for example can be formulated from existing components of a more or less conventional bearing structure 20'. For example, the thrust ring 130 can comprise a pair of threadedly engaged ring numbers 132, 134 of conventional configuration, which are modified in accordance with my present invention. After the ring members 132, 134 are threaded together as shown, they are spot welded or otherwise permanently joined to form a unitary construction. One of the rings for example the ring member 134 is tapped at 136 to receive cap screws 138, whereby key member 140 is secured to the thrust ring 130. A pair of diametrically opposed, arcuate wedge members (FIG. 4) 142, 144 are welded or otherwise secured to the outward end face of ring member 132. The key 140 rides in grooves 86'a and 86', as the thrust ring 130 is fitted over the adjacent end portion of the roll neck 22'.

When the thrust mechanism 28' is in its collapsed condition (FIGS. 3–5) the thrust ring wedge members 142, 144 are angularly displaced from similar and complementarily shaped wedge members 146, 148 of thrust clamp 150.

The thrust clamp 150, as in the preceeding group of figures, includes a pair of half rings 108', 110', which are pivoted and can be clamped together with swing bolt 114'. The thrust clamp 150 is provided with additional operating or tool-engaging extensions 118', in this case four in number, although a different number can be utilized as desired. The operating extensions likewise contain holes 120' for engagement by a suitable manipulative tool for angularly displacing the thrust clamp 150.

The turning of the thrust clamp 150 engages its arcuate wedges 146, 148 with the arcuate wedges 142, 144 respectively of the thrust ring 130, as better shown in FIG. 2. As described previously in connection with FIG. 1 and related figures, the wedging action thus supplied is adequate for seating the inner bearing race 36' and associated components against the roll neck flange 26 (FIG. 1). One of the thrust wedges, for example the wedge 142, can be located centrally about the adjacent end of the keying member 140, as evident from FIGS. 2 and 3, to avoid the application of canting forces to the key 140.

In operation, referring to FIG. 1 and relevant figures, the roll bearing assembly 20 including the thrust mechanism 28 are assembled in the following manner. The bearing assembly 20, including the roll box 40 is placed on the roll neck 22 and slipped therealong until the spacing ring 44 is adjacent the neck shoulder 46. The roll 24 should be positioned so that the keyway or groove 86—86a of the roll neck 22 at this time is in a vertical position. At the same time, the thrust ring 66 is fitted over the roll neck 22 with the keying member 82 thereof riding along the aforementioned keyway 86–86a. The annular clamping ring 42 is conventionally seated on the outward end of the roll chock 40, whereupon its inward circumferential shoulder 74 serves as a limit retainer for the thrust ring 66, by virtue of the outer circumferential shoulder 72 thereof.

The opened thrust clamp 102 is then fitted over the roll end and placed in the journal 30 therefor. Nuts 117 of the swing bolt 114 are tightened to secure the thrust clamp halves 108, 110 in the journal 30. The swing bolt is thus tightened sufficiently only to seat the thrust clamp 102 in the journal 30 while still allowing the thrust clamp 102 to be angularly displaced about the roll neck 22. The thrust clamp 102 is then turned in such direction that engagement of the thrust clamp wedges 104, 106 with the thrust ring wedges 98, 100 respectively seats the thrust ring 66, the inner bearing race 36, and the spacing ring 44 tightly together and against the shoulder 46 of the roll neck 22.

Owing to the use of the thrust means or wedging arrangement of the invention it is necessary to turn the thrust clamp 102 through a limited displacement in this case less than 180°. A considerable saving of time during the roll changing, de-chocking operation is thus effected, by a thrust mechanism of relatively simplicity. The thrust clamp 102 is then preferably turned in the reverse direction, approximately one-fourth inch in the illustrated case, to provide running clearance for the bearing arrangement 20. Following this operation, the swing bolt nuts 17 are tightened and locked so that the thrust clamp 102, the thrust mechanism 28, and other components of the bearing assembly 20 are securely clamped to the roll neck 22 and between the journal 30 and shoulder 26 thereof against further relative movement.

From the foregoing description it will be evident that the bearing assembly 20 can be quickly assembled on the roll neck 22. By the same token, the bearing assembly 20 can be quickly withdrawn therefrom by reversing the aforedescribed assembly steps, with the omission, of course, of the step involving the running clearance. With these quick-assembly and quick-withdrawal steps it will be evident that a large component of the time and labor involved in the roll shop or other locus of the de-chocking operation is eliminated.

From the foregoing it will be apparent that novel and efficient forms of Thrust Mechanism for a Mill Roll Bearing Assembly and the Like have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. A thrust mechanism for urging a bearing arrangement against first stop means on a shaft structure, said thrust mechanism including a first thrust member mounted on said shaft structure for rotation therewith and engageable with said bearing arrangement, means for mounting said first thrust member for movement longitudinally of said shaft structure and for restraining said first thrust member against movement thereof relative to said shaft structure, a second thrust member mounted against second stop means on said shaft structure, means for mounting said second thrust member for a predetermined limited angular displacement thereof relative to said shaft structure and for preventing further movement of said second thrust member following said predetermined angular displacement, and means on at least one of said thrust members for engaging the other of said thrust members for urging said thrust member and said bearing arrangement longitudinally against said first stop means and said second thrust member against said second stop means upon angular displacement of said second thrust member.

2. A thrust mechanism on a shaft structure, said mechanism comprising a member slidably mounted on said structure for movement longitudinally thereof, stop means positioned on said structure at the terminus of said movement, first and second thrust members, said first thrust member being slideably mounted on said structure for movement longitudinally thereof into bearing contact with said slideable member, means for slideably mounting said first thrust member against turning movement thereof relative to said structure, second stop means on said shaft structure, means for mounting said second thrust member against said second stop means for turning movement thereof relative to said shaft structure, means for securing said second thrust member to said structure against further turning movement thereof following a predetermined limited angular displacement of said second thrust member, and means on at least one of said thrust members and engageable with the other of the said thrust members for urging said first thrust member and said slideable member against said first stop means and for urging said second thrust member against said second stop means.

3. The combination according to claim 2 wherein said thrust members are of annular configuration and are fitted over said shaft structure.

4. The combination according to claim 3 wherein said first thrust member is prevented from turning movement relative to said shaft structure by a key and key-way therefor formed on said first thrust member and said shaft structure.

5. The combination according to claim 2 wherein said urging means include a wedging arrangement secured to at least one of said thrust members and engageable with the other of said thrust members.

6. The combination according to claim 5 wherein at least one arcuate wedge member is secured to each of said annular thrust members for complementary engagement with the wedge member on the other of said thrust members.

7. The combination according to claim 3 wherein said urging means include an arcuate wedge member secured to at least one of said thrust members and engageable with a projection on the other of said thrust members.

8. The combination according to claim 2 wherein said second stop means include a journal formed in said shaft structure, and said second thrust member is of annular configuration and seated in said journal.

9. The combination according to claim 8 wherein said second thrust member is formed from a pair of half rings pivoted at one pair of adjacent ends thereof, and claim means are engageable with the other adjacent ends of said half rings for varyingly urging said other adjacent ends together to seat said second thrust member in said journal and to clamp said second thrust member to said shaft structure.

10. The combination according to claim 2 wherein said slideable member is of sleeve configuration and is fitted over said shaft structure, said first thrust member including a tubular extension fitted over said shaft structure for bearing engagement with said slideable member.

11. The combination according to claim 2 wherein said second thrust member is provided with tool engaging means thereon.

12. A thrust mechanism and bearing arrangement on a rotatable shaft or the like, said arrangement including an inner race fitted over said shaft and slideable therealong said mechanism including, first stop means on said shaft for delimiting sliding movement of said inner race, first and second annular thrust members fitted over said shaft and slideable therealong, second stop means on said shaft and engageable with an adjacent one of said thrust members on a side opposite from said inner race to delimit the slidable movement of said thrust members and said inner race in the opposite direction, the other of said thrust members being shaped for bearing engagement with said inner race, said other thrust member having restraining means preventing rotational movement relative to said shaft and means on said thrust members and on said shaft and operable upon turning movement of one of said thrust members for urging said one thrust member against said second stop means and for urging said other thrust member and said inner bearing race into bearing contact and against said first stop means.

13. The combination according to claim 12 wherein said urging means include wedging arrangement on at least one of said thrust members and engageable with the other of said thrust members for driving said thrust members apart upon said turning movement.

14. The combination according to claim 12 wherein said wedging arrangement include a pair of arcuate wedge members secured to at least one of said thrust members.

15. The combination according to claim 14 wherein a pair of said wedge members are secured to each of said thrust members, and the wedge members of each thrust member are substantially diametrically opposed.

16. The combination according to claim 12 wherein said bearing arrangement includes an outer race mounted in a support therefor, an annular clamp member is mounted on said support for positioning said outer race therein, said claim member having inwardly extending retaining means for engaging an adjacent one of said thrust members at a limit of sliding movement thereof.

* * * * *